April 22, 1947. F. C. AMES 2,419,383
MEANS FOR PREVENTING DETERIORATION OF ELECTRODES IN HEAT TREATING
Filed Oct. 25, 1944

INVENTOR.
FRANK C. AMES
BY
ATTORNEY

Patented Apr. 22, 1947

2,419,383

UNITED STATES PATENT OFFICE 2,419,383

MEANS FOR PREVENTING DETERIORATION OF ELECTRODES IN HEAT-TREATING

Frank C. Ames, Detroit, Mich.

Application October 25, 1944, Serial No. 560,331

2 Claims. (Cl. 13—23)

This invention relates to means for preventing deterioration of electrodes in salt pots used in heat treating metal elements.

The electrodes in the usual salt pot are eaten away either by vapors arising from the surface of the liquid in the pot or due to the salt liquid itself at the surface thereof in the pot which becomes encrusted on the electrodes and tends to rise thereon by capillary attraction.

These and other features and objects of the invention are hereinafter more fully described and claimed and apparatus involving my invention is shown in its preferred form in the accompanying drawing in which—

Figures 1, 2:
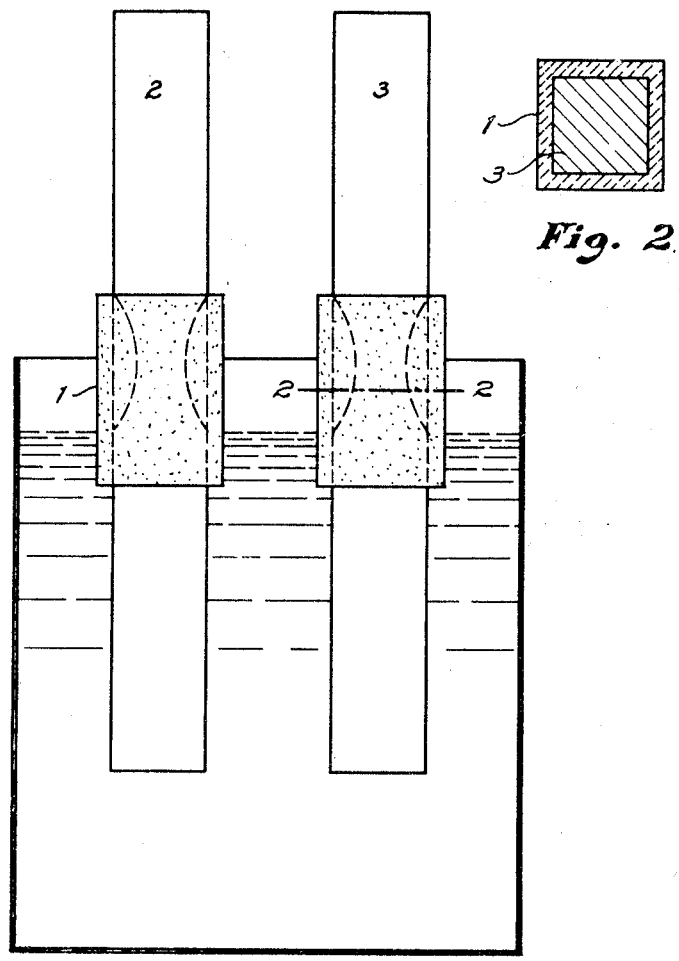
Fig. 1 is a sectional view of a salt pot showing the electrodes positioned therein.
Fig. 2 is a cross section taken on line 2—2 of Fig. 1.

In the heat treating of material in a salt pot the vapors arising from the surface of the heated liquid attack the surface of the electrodes for a distance above the liquid level which is usually maintained substantially constant.

To prevent such deterioration I encase the electrodes in a refractory material, indicated at 1 in Figs. 1 and 2, at such point on the electrodes 2 and 3 that the refractory material extends to below the liquid level, normally called the salt line, and extends upwardly for such distance thereabove as may be required to prevent the vapors arising from the liquid surface from contacting the electrodes.

By this arrangement the electrodes may be constantly used over a long period avoiding the cost in electrodes and time required by frequent replacement thereof. While the invention is simple in character it effects a material saving in cost of electrodes not provided with such protection.

The preferred materials utilized in forming the refractory element is a chrome-magnesite high temperature cement mixed with a suitable grog. The mixture is rammed into a form to provide the desired shape and density. This material has chemical characteristics insuring a strong refractory bond having the desired strength and effectively resistant to fluxing agents.

While I have shown the electrodes as being rectangular in cross section they may be of other form within the spirit and scope of this invention.

Having thus briefly described my invention, its utility and mode of operation, what I claim and desire to secure by Letters Patent of the United States is:

1. Means for preventing deterioration of electrodes used in salt baths for heat treatment of metal articles, comprising a shield formed of a material such as chrome-magnesite cement in fixed surface contact with the electrode enclosing a portion of the electrode, said shield extending below the liquid level in the bath and extending thereabove for a distance beyond the portion thereof normally affected by the liquid and/or the vapors arising from the liquid surface.

2. Means for preventing deterioration of electrodes used in heating salt baths utilized in heat treating metals, comprising a shield formed of a refractory material such as chrome-magnesium high temperature cement in fixed surface contact with the portions of the electrodes for a distance below the liquid surface in the bath and extending thereabove a distance to shield that portion of the electrodes normally affected by the liquid and/or the vapors arising from the surface of the liquid.

FRANK C. AMES.

REFERENCES CITED

The following references are of record in the file of this patent:

UNITED STATES PATENTS

| Number | Name | Date |
|---|---|---|
| 1,323,768 | Hyde | Dec. 2, 1919 |
| 1,637,795 | Andrews | Aug. 2, 1927 |
| 1,792,674 | Bellis | Feb. 17, 1931 |
| 1,946,302 | Weller | Feb. 6, 1934 |
| 2,223,139 | Upton | Nov. 26, 1940 |
| 2,315,725 | Moller | Apr. 6, 1943 |

FOREIGN PATENTS

| Number | Country | Date |
|---|---|---|
| 99,936 | Swedish | Oct. 1, 1940 |